US008686585B2

(12) United States Patent
Lin

(10) Patent No.: US 8,686,585 B2
(45) Date of Patent: Apr. 1, 2014

(54) KINETIC ENERGY GENERATION DEVICE

(76) Inventor: Hsien-Ming Lin, Zhubei (CN)

( * ) Notice: Subject to any disclaimer, the term of this patent is extended or adjusted under 35 U.S.C. 154(b) by 0 days.

(21) Appl. No.: 13/583,639

(22) PCT Filed: Feb. 17, 2011

(86) PCT No.: PCT/CN2011/000250
§ 371 (c)(1),
(2), (4) Date: Sep. 10, 2012

(87) PCT Pub. No.: WO2012/106835
PCT Pub. Date: Aug. 16, 2012

(65) Prior Publication Data
US 2013/0001949 A1 Jan. 3, 2013

(30) Foreign Application Priority Data

Feb. 10, 2011 (CN) .......................... 2011 1 0035351

(51) Int. Cl.
F03B 13/00 (2006.01)
(52) U.S. Cl.
USPC ........................................................... 290/54
(58) Field of Classification Search
USPC .................................. 290/43, 52, 54
See application file for complete search history.

(56) References Cited

U.S. PATENT DOCUMENTS

| 502,624 | A | * | 8/1893 | Holcomb | 290/40 E |
|---|---|---|---|---|---|
| 1,483,505 | A | * | 2/1924 | Bradshaw | 415/5 |
| 3,984,698 | A | * | 10/1976 | Brewer | 290/54 |
| 4,345,160 | A | * | 8/1982 | Smith | 290/52 |
| 5,440,175 | A | * | 8/1995 | Mayo et al. | 290/54 |
| 5,755,553 | A | * | 5/1998 | Laemthongsawad | 415/3.1 |
| 8,164,209 | B2 | * | 4/2012 | Rovinsky | 290/54 |
| 8,421,261 | B2 | * | 4/2013 | Drews | 290/54 |
| 2006/0033341 | A1 | * | 2/2006 | Kaufman | 290/54 |
| 2006/0202482 | A1 | * | 9/2006 | Park | 290/43 |
| 2006/0290139 | A1 | * | 12/2006 | Takeuchi | 290/54 |
| 2008/0238104 | A1 | * | 10/2008 | Dale | 290/54 |
| 2009/0115189 | A1 | * | 5/2009 | Lin | 290/43 |
| 2011/0204627 | A1 | * | 8/2011 | Ho et al. | 290/43 |
| 2012/0001433 | A1 | * | 1/2012 | Mowad | 290/54 |
| 2012/0074703 | A1 | * | 3/2012 | Lin | 290/54 |

* cited by examiner

Primary Examiner — Tho D Ta
(74) Attorney, Agent, or Firm — Leong C. Lei

(57) ABSTRACT

A kinetic energy generation device includes a rotation mechanism, a speed increaser coupled to the rotation mechanism, and a power generation element coupled to the speed increaser. The rotation mechanism includes a central shaft and an outer circumferential zone surrounding the central shaft. The outer circumferential zone receives therein partition plates set in radial direction and spaced from each other so that the partition plates show upward inclination. The central shaft is rotatably coupled to the speed increaser, and the speed increaser is coupled to the power generation element so as to constitute the kinetic energy generation device. The rotation mechanism is arranged under a water flow in order to allow each of the receiving zones to receive a weight of water, so that the weight of water causes the rotation mechanism to rotate in a given direction and thus drives the speed increaser to generate electrical power.

7 Claims, 7 Drawing Sheets

KINETIC ENERGY GENERATION DEVICE

TECHNICAL FIELD OF THE INVENTION

The present invention generally relates to a kinetic energy generation device, and more particularly to a kinetic energy generation device that is cyclically operable to generation sustaining electrical power without external activation energy.

DESCRIPTION OF THE PRIOR ART

The Earth energy is continuously consumed and greenhouse effect is getting serious day by day. This leads to gradual shortage of energy. All countries of the world are devoted to the development of generation of electrical power in a natural way. The current measures that are used to generate electrical power include thermal power, hydraulic power, wind power, and nuclear power. For thermal power generation, the operation of power generation is based of burning fossil fuels, so that it is closely related to the resources of Earth and is also concerned about "burning", making it is the major source of greenhouse gases.

For hydraulic power generation, a dam is often constructed and the number of power generator sets used is great. Actually, a water flow of a substantially striking power is required for rotating the power generator sets in order to drive the power generator sets to generate electrical power. This leads to a high expenditure and also requires a proper area for installation, making it hard to get popularized.

For wind power generation, a high-rise tower must be constructed and large-sized blades are mounted to the top of the tower. Actually, winds must be present in order to move the blades in order to have the blades rotated to drive a power generator set to generate electrical power. The expenditure is also high and an area where winds constantly blow is needed for installation. This kind of power energy is not suitable for areas where wind is generally weak.

For nuclear power generation, although it is clean energy, yet safety and contamination to the Earth are questionable by the environmental protectionist and are subjected to repeated and constant dispute.

In view of these problems, the present invention aims to provide a solution that allows the generation of energy to also achieve environmental protection and ensure stable operation to improve the current environmental problem that is caused by factors concerning energy.

SUMMARY OF THE INVENTION

The primary object of the present invention is to overcome the above discussed problems of the known techniques by providing a kinetic energy generation device, wherein the generation of kinetic energy requires no external activation energy, neither water flows of substantial flushing power, but achieves cyclical operation to continuously generate electrical power.

The technical solution that the present invention adopts to overcome the technical problems is as follows:

A kinetic energy generation device is characterized by comprising a rotation mechanism, a speed increaser coupled to the rotation mechanism, and a power generation element coupled to the speed increaser, wherein the rotation mechanism comprises a central shaft and an outer circumferential zone circumferentially surrounding the central shaft; the outer circumferential zone receives therein a plurality of partition plates that is set in radial direction and spaced from each other in such a way that the partition plates show upward inclination in a direction from outer side to inner side and through increase or decrease of the number of the partition plates, adjustment of spacing distance is realized to form a plurality of receiving zones of different volumes; the central shaft of the rotation mechanism is rotatably coupled to the speed increaser, and the speed increaser is in turn coupled to the power generation element so as to constitute the kinetic energy generation device, whereby the rotation mechanism is arranged under a water flow in order to allow each of the receiving zones of the rotation mechanism to receive a weight of water, so that the weight of water causes the rotation mechanism to rotate in a given direction and thus drives the speed increaser, with speed being increased through the speed increaser, a shaft of the power generation element being rotated to generate electrical power to be supplied to various electrical equipments.

In the previous kinetic energy generation device, the rotation mechanism is mounted on a rack.

In the previous kinetic energy generation device, the central shaft of the rotation mechanism is positioned on the rack by bearings so that the rotation mechanism is rotatable about the central shaft serving as a support point.

In the previous kinetic energy generation device, the outer circumferential zone of the rotation mechanism is composed of vertical section and the horizontal section.

In the previous kinetic energy generation device, a universal joint is arranged between the speed increaser and the power generation element to make rotation smooth.

In the previous kinetic energy generation device, the rotation mechanism, the speed increaser and the power generation element coupled to the rotation mechanism, and the rack is arranged in such a way that multiple of these components are vertically stacked, whereby a water flow, when falling downward, successively drives, in a direction from upper side to lower side, the rotation mechanisms to in turn drive the speed increasers and the power generation elements, so that the electrical power generated by the power generation elements is serially connected to provide an output of increased power.

In the previous kinetic energy generation device, a pipe is arranged outside the multiple vertically-stacked rotation mechanisms, the speed increasers and the power generation elements coupled to the rotation mechanisms, and the rack and a water tank is arranged at bottom, the pipe being connected to the bottom water tank and having an upper end set at the rotation mechanism of topmost layer, whereby a water pump is provided to pump water from the bottom water tank to the topmost layer in order to realize cyclic operation to continuously supply electrical power The present invention comprises a rotation mechanism that is mounted on a rack. The rotation mechanism has a central shaft and an outer circumferential zone that circumferentially surrounds the central shaft and is composed of vertical sections and a horizontal section to form a generally U-shape. The outer circumferential zone receives a plurality of partition plates that is set in radial direction and spaced from each other in such a way that the partition plates show upward inclination in a direction from outer side to inner side so as to form a plurality of receiving zone. The central shaft of the rotation mechanism is rotatably coupled to a speed increaser and the speed increaser is coupled to a power generation element. The rotation mechanism is placed under a water flow in order to allow each of the receiving zones of the rotation mechanism to receive a weight of water, so that the weight of water causes the rotation mechanism to rotate in a given direction and thus drives the speed increaser. With speed being increased through the speed increaser, a shaft of the power generation element is driven to generate electrical power.

According to the present invention, universal joints are respectively arranged between the rotation mechanism and the speed increaser and between the speed increaser and the power generation element in order to make transmission smooth.

The efficacy of the present invention is that the generation of kinetic energy requires no external activation energy, neither water flows of substantial flushing power, but achieves cyclical operation to continuously generate electrical power.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
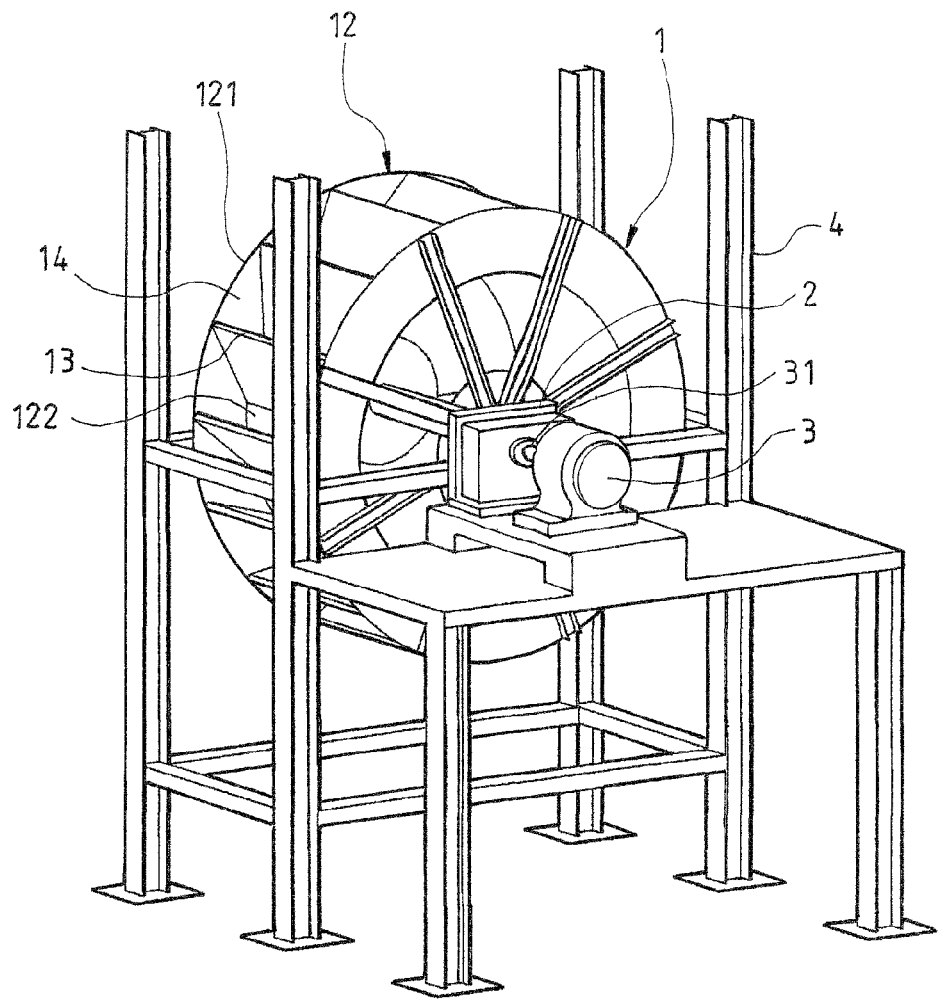
FIG. 1 is a perspective view of the present invention.
Figure 2:
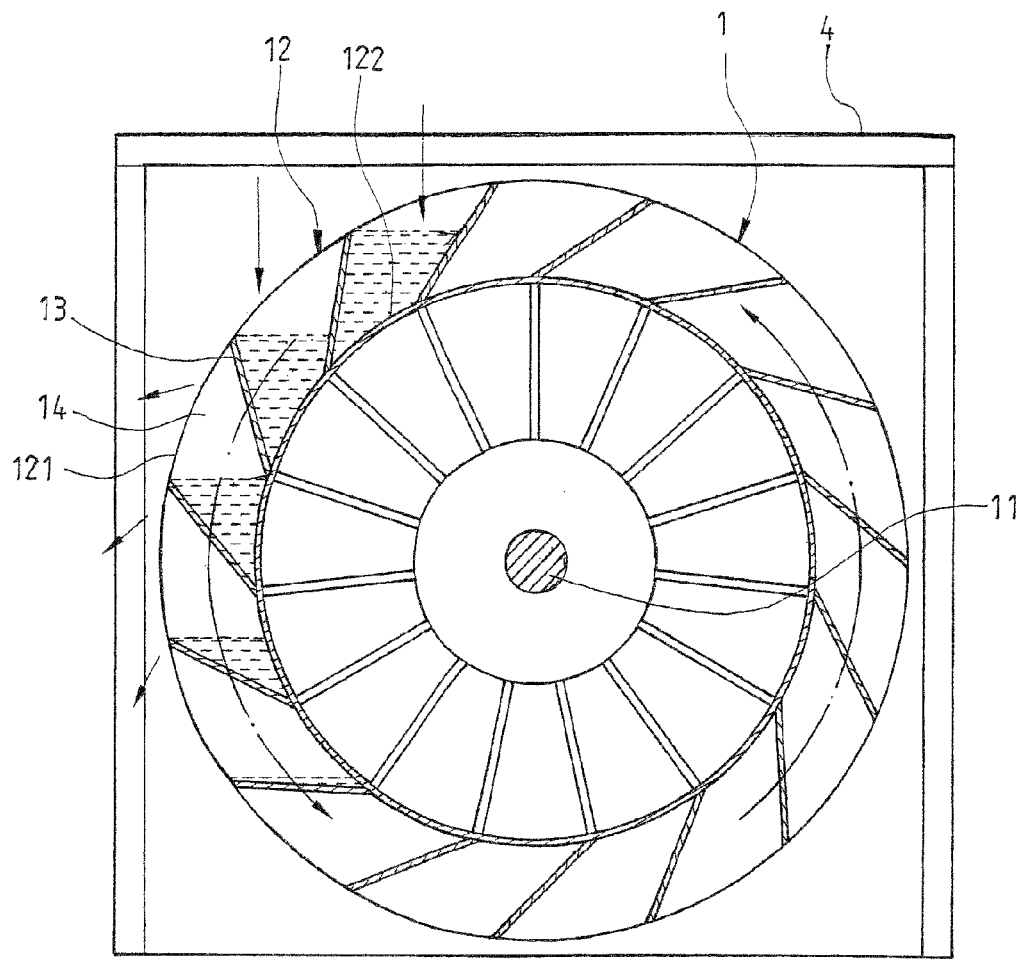
FIG. 2 is a cross-sectional view of the present invention.

Referring to both FIGS. 1 and 2, a perspective view and a cross-sectional view of the present invention are shown. As shown in the drawings, the present invention comprises a rotation mechanism 1, a speed increaser 2 coupled to the rotation mechanism 1, and a power generation element 3 coupled to the speed increaser 2. The rotation mechanism 1 is mounted on a rack 4 and comprises a central shaft 11 and an outer circumferential zone 12 circumferentially surrounding the central shaft 11. The central shaft 11 is positioned on the rack 4 by bearings so that the rotation mechanism 1 is rotatable about the central shaft 11 serving as a support point. The outer circumferential zone 12 is composed of vertical section 121 and a horizontal section 122 to form a generally U-shape. The outer circumferential zone 12 receives a plurality of partition plates 13 that is set in radial direction and spaced from each other. The partition plates 13 show upward inclination in a direction from outer side to inner side so as to form a plurality of receiving zones 14. In the instant embodiment, the spacing distance X between the receiving zones 14 and the central shaft 11 can be varied as desired to constitute an arm of force of different lengths thereby varying the rotational speed of the rotation mechanism 1.

The central shaft 11 of the rotation mechanism 1 is rotatably coupled to the speed increaser 2, and the speed increaser 2 is in turn rotatably coupled to another universal joint 31 for being coupled, through the universal joint 31, to the power generation element 3 (power generator).

Properly assembling the above discussed components/elements constitutes a kinetic energy generation device. The rotation mechanism 1 is placed under a water flow in order to allow each of the receiving zones 14 of the rotation mechanism 1 to receive a weight of water, so that the weight of water causes the rotation mechanism 1 to rotate in a given direction and thus drives the speed increaser 2. With speed being increased through the speed increaser 2, a shaft of the power generation element 3 is rotated to generate electrical power to be supplied to various electrical equipments.

Figure 3:
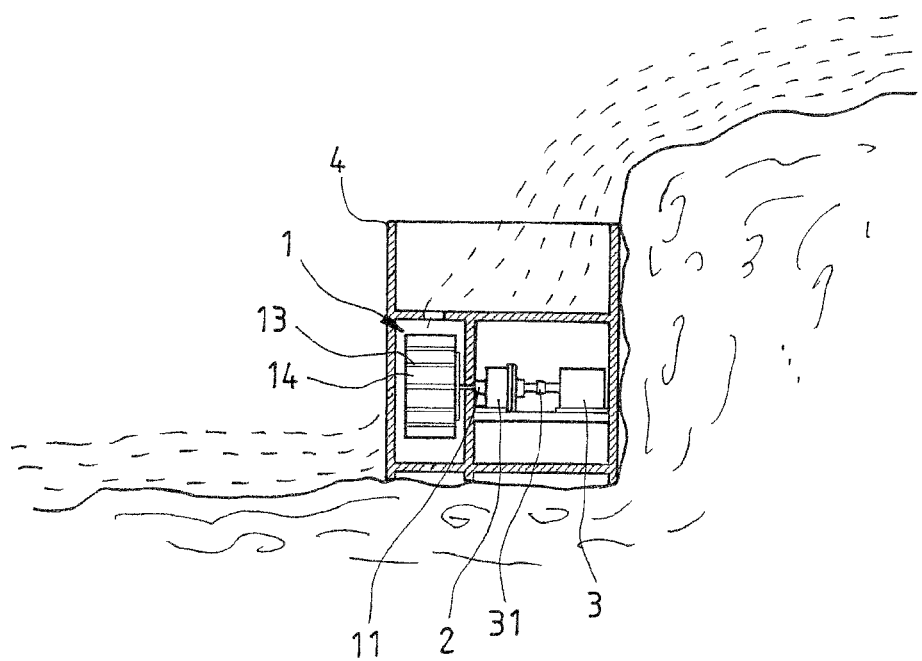
FIGS. 3 and 4 are schematic views illustrating the operation of the present invention.
Figure 4:
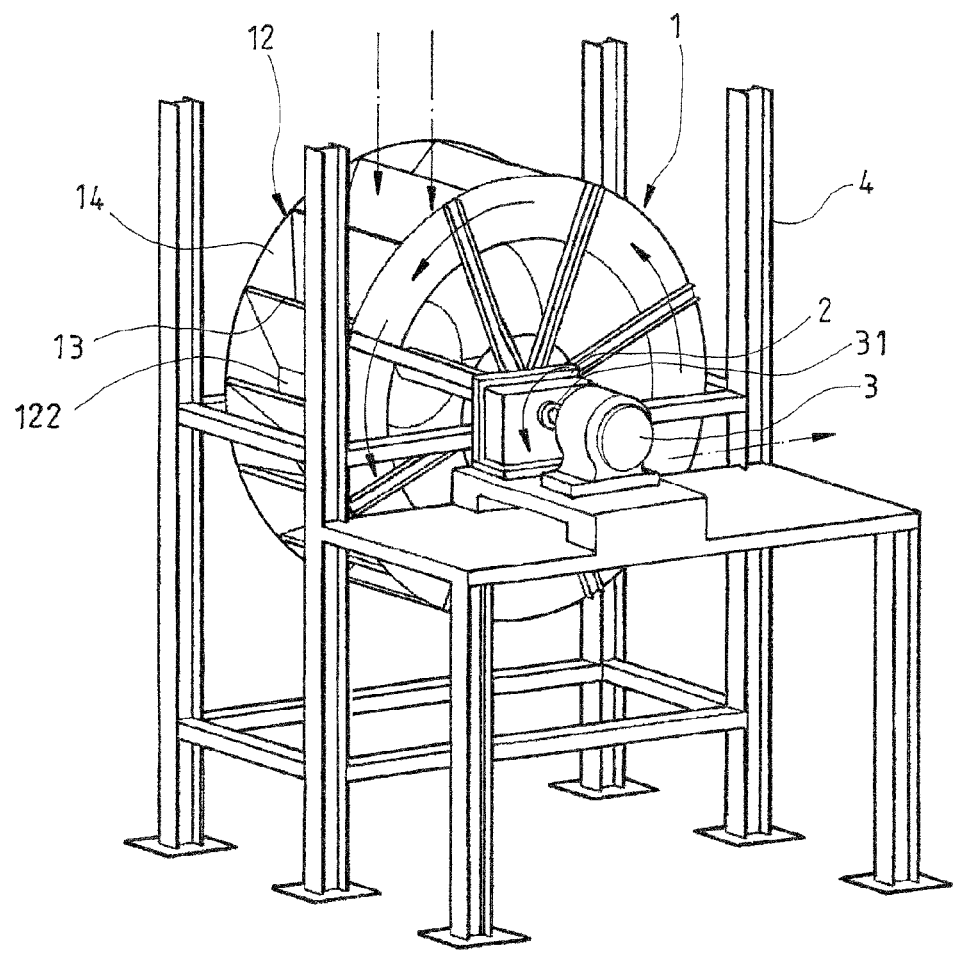

Referring to both FIGS. 3 and 4, operations of the present invention are illustrated. As shown in the drawings, to use the present invention, the rotation mechanism 1 is placed under a water flow (such as a vertical falling area of river or streams) to allow the water to directly fall into each of the receiving zones 14 of the rotation mechanism 1 so that each of the receiving zones 14, after receiving the weight of water, is caused by the water weight to move downward, making the rotation mechanism 1 rotating in a preset direction about the central shaft 11 that serves as a support point, thereby driving the speed increaser 2 and after the speed is increased by the speed increaser 2, the shaft of the power generation element 3 is driven thereby to generate electrical power supplied to various electrical equipments. Coupling between the rotation mechanism 1 and the speed increaser 2 and between the speed increaser 2 and the power generation element 3 are achieved through universal joints 31 that serve as interconnection elements to make the transmission smoother.

Referring to FIG. 2 again, the spacing distance X between the receiving zones 14 of the rotation mechanism 1 of the present invention and the central shaft 11 can be varied as desired to constitute an arm of force of different lengths. If the space where installation is to be made is sufficiently large, the present invention may increase the width of the receiving zones 14 to make the rotation mechanism 1 operating in a more effort-saving manner and thus making the rotational speed of the rotation mechanism 1 increased and the performance of generating energy naturally improved.

Figure 5:
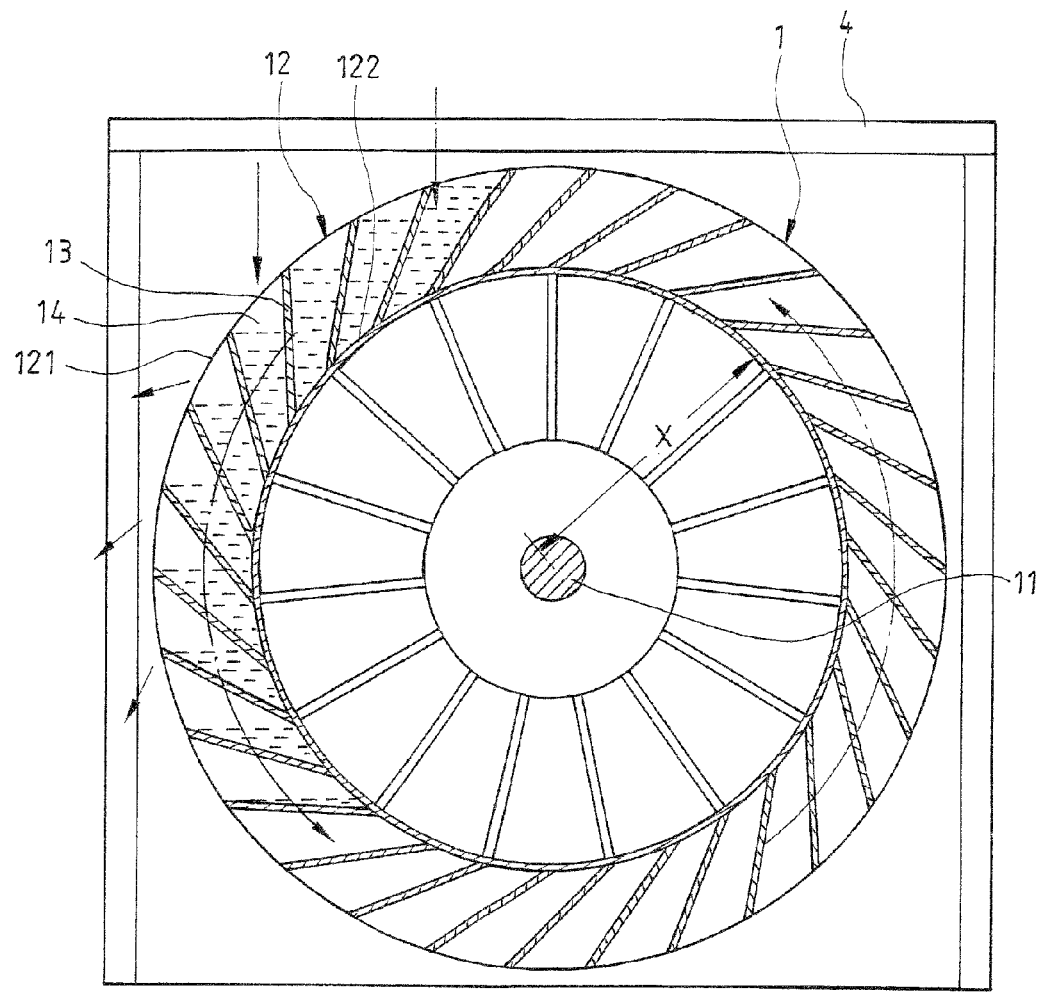
FIG. 5 is a view showing a rotation mechanism according to another embodiment of the present invention.

Referring to FIG. 5, a view is given to show a rotation mechanism according to another embodiment. As shown in the drawings, the outer circumferential zone 12 of the rotation mechanism 1 according to the present invention comprises a plurality of partition plates 13 that is set in radial direction and spaced from each other. The number can be increased if desired and thus the receiving zones 14 are increased. (In the instant embodiment, the number of the partition plates 13 of FIG. 2 is doubled so that the number of the receiving zones 14 is also doubled.) As such, when the rotation mechanism 1 rotates, since the number of the receiving zones 14 that are located on, above, and below the horizontal line of the central shaft 11 are increased, the amount of water staying therein is increased to thereby increase the rotational speed of the rotation mechanism 1 and thus improve performance of power generation.

Figure 6:
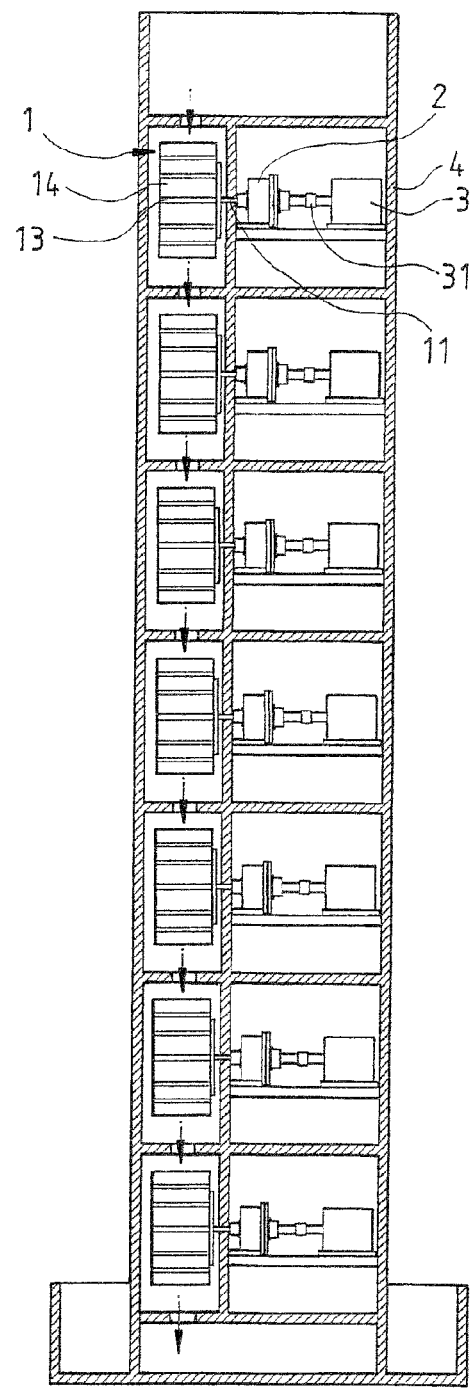
FIG. 6 is a view showing another embodiment of the present invention.

Referring to FIG. 6, a view is given to show another embodiment of the present invention. Reference is also made to FIG. 1, and as shown in the drawings, the present invention may vertically stack a plurality of kinetic energy generation devices and also provide a plurality of speed increasers 2 and power generation elements 3. A water flow, when falling downward, successively drives, in a direction from upper side to lower side, the rotation mechanisms 1 to in turn drive the speed increasers 2 and the power generation elements 3, so that the electrical power generated by the plurality of power generation elements 3 can be serially connected to provide an output of increased power.

Figure 7:
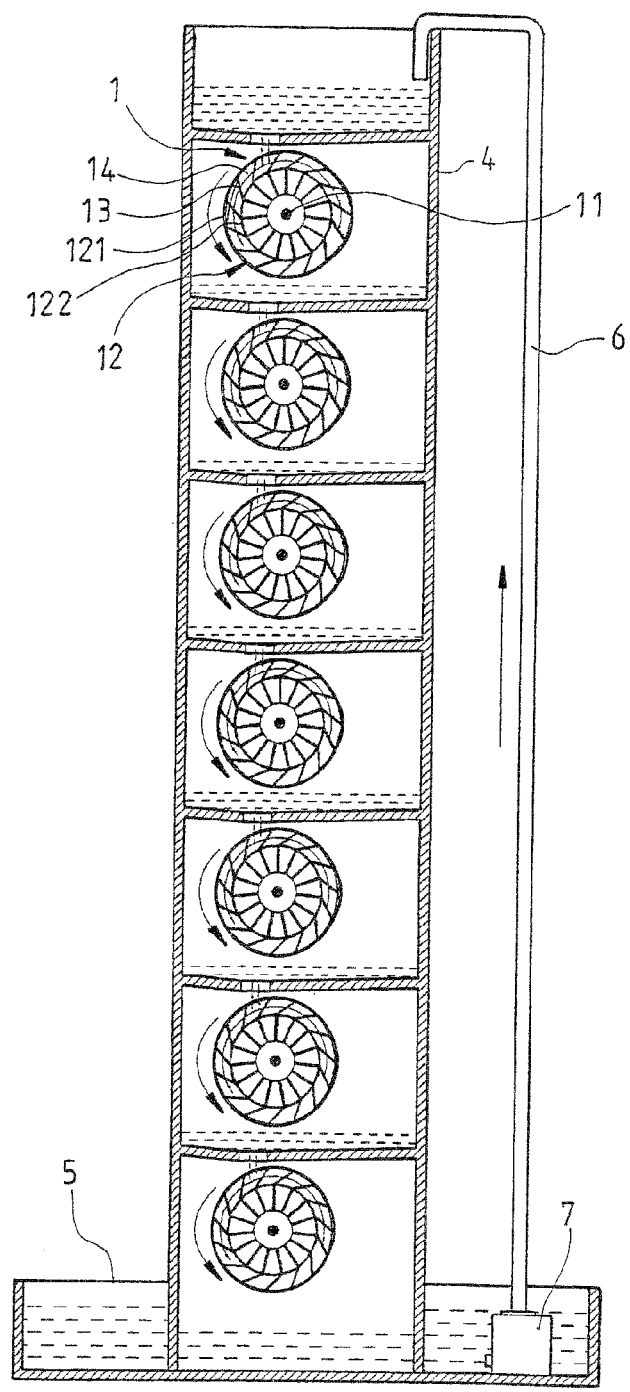
FIG. 7 is a view showing a further embodiment of the present invention.

Referring to FIG. 7, a view is given to show a further embodiment of the present invention, in which a pipe 6 is arranged outside the vertically stacked kinetic energy generation devices shown in FIG. 5 to connect to a bottom water tank 5 with an upper end of the pipe 6 set at the topmost layer of the kinetic energy generation devices. A water pump 7 is provided to pump the water inside the bottom water tank 5 to the top layer in order to realize cyclic operation to continuously supply electrical power.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A kinetic energy generation device, characterized by comprising a rotation mechanism, a speed increaser coupled to the rotation mechanism, and a power generation element coupled to the speed increaser, wherein the rotation mechanism comprises a central shaft and an outer circumferential zone circumferentially surrounding the central shaft; the outer circumferential zone receives therein a plurality of straight planar partition plates that is set in radial direction and spaced from each other in such a way that the partition plates show upward inclination in a direction from outer side to inner side and allows for increase or decrease of the number of the partition plates to achieve adjustment of spacing distance and to form a plurality of receiving zones of selectively varied volumes; the central shaft of the rotation mechanism is rotatably coupled to the speed increaser, and the speed increaser is in turn coupled to the power generation element so as to constitute the kinetic energy generation device, whereby the rotation mechanism is arranged under a water flow in order to allow each of the receiving zones of the rotation mechanism to receive a weight of water, so that the weight of water causes the rotation mechanism to rotate in a given direction and thus drives the speed increaser, with speed being increased through the speed increaser, a shaft of the power generation element being rotated to generate electrical power to be supplied to various electrical equipments.

2. The kinetic energy generation device according to claim 1, characterized in that the rotation mechanism is mounted on a rack.

3. The kinetic energy generation device according to claim 1, characterized in that the central shaft of the rotation mechanism is positioned on the rack by bearings so that the rotation mechanism is rotatable about the central shaft serving as a support point.

4. The kinetic energy generation device according to claim 1, characterized in that the outer circumferential zone of the rotation mechanism is composed of vertical section and the horizontal section.

5. The kinetic energy generation device according to claim 1, characterized in that a universal joint is arranged between the speed increaser and the power generation element to make rotation smooth.

6. The kinetic energy generation device according to claim 1, characterized in that the rotation mechanism, the speed increaser and the power generation element coupled to the rotation mechanism, and the rack is arranged in such a way that multiple of these components are vertically stacked, whereby the water flow is allowed to fall down from one of the multiple of these components to the other one of the multiple of these components to successively drive, in a direction from upper side to lower side, the rotation mechanisms to in turn drive the speed increasers and the power generation elements, so that the electrical power generated by the power generation elements is serially connected to provide an output of increased power.

7. The kinetic energy generation device according to claim 2, characterized in that the rotation mechanism, the speed increaser and the power generation element coupled to the rotation mechanism, and the rack is arranged in such a way that multiple of these components are vertically stacked, whereby the water flow is allowed to fall down from one of the multiple of these components to the other one of the multiple of these components to successively drive, in a direction from upper side to lower side, the rotation mechanisms to in turn drive the speed increasers and the power generation elements, so that the electrical power generated by the power generation elements is serially connected to provide an output of increased power.

* * * * *